(12) United States Patent
Taudt et al.

(10) Patent No.: US 11,193,641 B2
(45) Date of Patent: Dec. 7, 2021

(54) MOTOR VEHICLE HEADLIGHT HAVING WAVEGUIDE ELEMENTS ARRANGED IN MATRIX FORM

(71) Applicant: ZKW Group GmbH, Wieselburg (AT)

(72) Inventors: Lukas Taudt, Wieselburg (AT); Nina Brauner, Wieselburg (AT); Josef Hechenberger, Mondsee (AT); Matthias Kern, Prinzersdorf (AT); Christoph Längauer, Lunz am See (AT); Mathias Schragl, Zarnsdorf (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/969,364

(22) PCT Filed: Jan. 28, 2019

(86) PCT No.: PCT/EP2019/052008
§ 371 (c)(1),
(2) Date: Aug. 12, 2020

(87) PCT Pub. No.: WO2019/158348
PCT Pub. Date: Aug. 22, 2019

(65) Prior Publication Data
US 2021/0048161 A1 Feb. 18, 2021

(30) Foreign Application Priority Data
Feb. 19, 2018 (EP) .................................... 18157331

(51) Int. Cl.
*F21S 41/24* (2018.01)
*F21S 41/143* (2018.01)
(Continued)

(52) U.S. Cl.
CPC ............. *F21S 41/24* (2018.01); *F21S 41/143* (2018.01); *F21S 41/153* (2018.01); *G02B 6/0046* (2013.01)

(58) Field of Classification Search
CPC ..... G02B 6/0046; G02B 6/0048; F21S 41/24; F21S 41/143; F21S 41/153
See application file for complete search history.

(56) References Cited

U.S. PATENT DOCUMENTS 9,046,237 B2 * 6/2015 Stefanov ............... F21S 41/143
2012/0275173 A1 11/2012 Hamm et al.
(Continued)

FOREIGN PATENT DOCUMENTS

| DE | 10302969 A1 | 8/2004 |
| DE | 102009053581 B3 | 3/2011 |
| JP | 2009238469 A | 10/2009 |

OTHER PUBLICATIONS

International Search Report for PCT/EP2019/052008, dated Apr. 23, 2019 (2 pages).
(Continued)

*Primary Examiner* — Rajarshi Chakraborty
*Assistant Examiner* — Michael Chiang
(74) *Attorney, Agent, or Firm* — Eversheds Sutherland (US) LLP

(57) ABSTRACT

The invention relates to a motor vehicle headlight (1) having a lamp unit (2), which has at least one light source (3) and an optical attachment (4) having a light emission surface (5), and having a projection lens (7) downstream of the lamp unit, wherein the optical attachment has a plurality of waveguide elements (6), each having a light coupling surface (8) for feeding in light from the at least one light source and having light decoupling surfaces (9) arranged in the light emission surface of the optical attachment and projects a light pattern forward in the traffic space, the waveguide (Continued)

Figure 1:
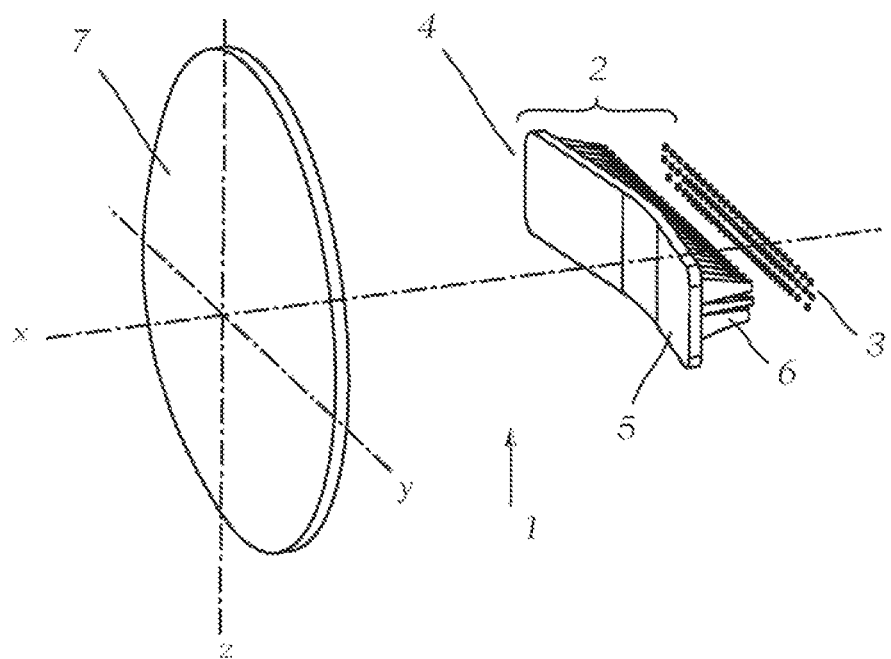

elements extend between the light coupling surface and the light decoupling surface, wherein the light decoupling surface has a greater area than the light coupling surface, and each waveguide element is laterally delimited by two lateral surfaces (10), from above by a roof surface (11) and below by a floor surface (12) and tapers between the light decoupling surface and the light coupling surface, wherein the width of the floor surface decreases proceeding from the light emission surface, wherein the floor surface (12) and/or the roof surface (11) of at least one waveguide element (6) has exactly one constriction (14) in respect of the width thereof between the light decoupling surface (9) and the light coupling surface (8), which has the smallest width ($b_m$) of the floor surface and/or of the roof surface.

9 Claims, 3 Drawing Sheets

(51) Int. Cl.
*F21S 41/153* (2018.01)
*F21V 8/00* (2006.01)

(56) References Cited

U.S. PATENT DOCUMENTS

| 2014/0104864 | A1  |         | 4/2014  | Brendle |                |
|---|---|---|---|---|---|
| 2015/0167913 | A1 | * | 6/2015 | Stefanov | F21S 41/285 |
|  |  |  |  |  | 362/511 |
| 2015/0226395 | A1 | * | 8/2015 | Taudt | F21S 41/153 |
|  |  |  |  |  | 362/511 |
| 2016/0146416 | A1 |  | 5/2016 | Taudt et al. |  |
| 2016/0146419 | A1 | * | 5/2016 | Reinprecht | F21S 41/153 |
|  |  |  |  |  | 362/512 |
| 2017/0030543 | A1 | * | 2/2017 | Gromfeld | F21S 41/322 |
| 2017/0067610 | A1 | * | 3/2017 | Lo | G02B 6/0045 |
| 2017/0343718 | A1 | * | 11/2017 | Lin | G02B 6/4206 |
| 2018/0313511 | A1 |  | 11/2018 | Lee |  |
| 2020/0003382 | A1 |  | 1/2020 | Godderidge et al. |  |

OTHER PUBLICATIONS

Search Report for European Application No. 18157331, dated Jun. 28, 2018 (2 pages).

* cited by examiner

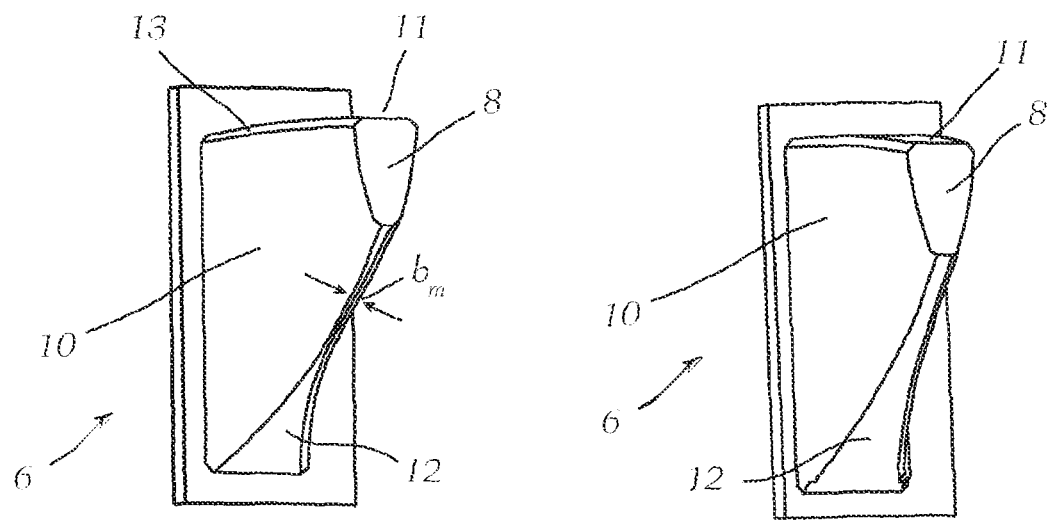
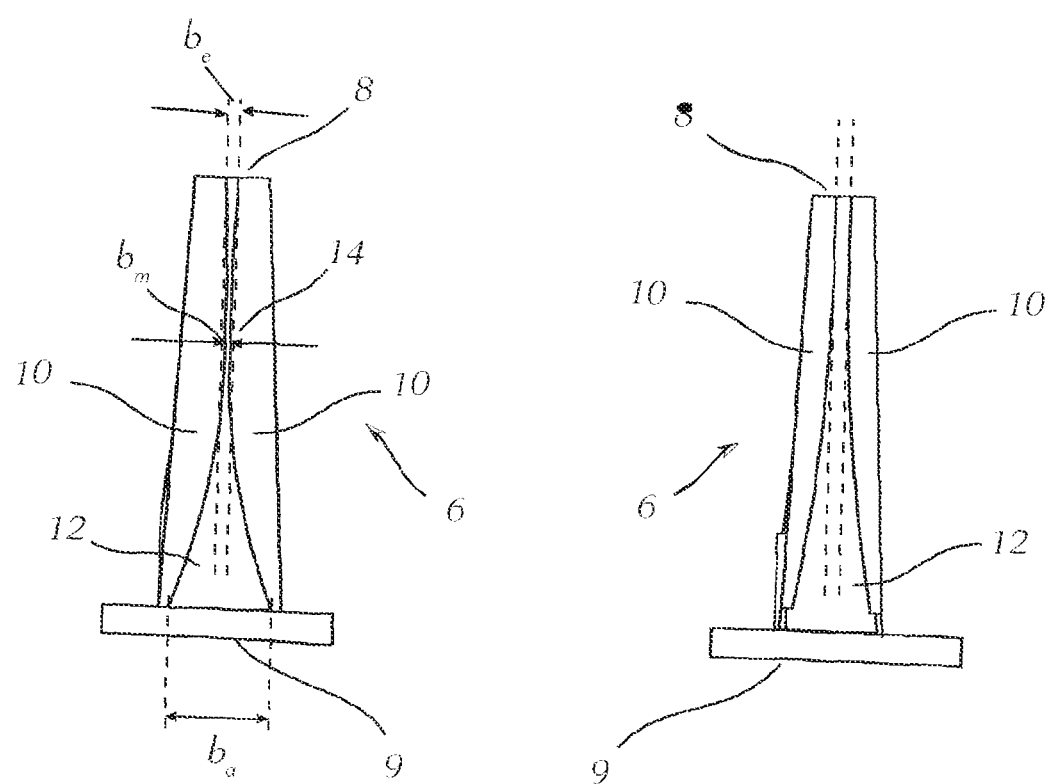
Fig. 3  Fig. 5 (Prior Art)
Fig. 4  Fig. 6 (Prior Art)

MOTOR VEHICLE HEADLIGHT HAVING WAVEGUIDE ELEMENTS ARRANGED IN MATRIX FORM

The invention relates to a motor-vehicle headlamp comprising a lighting unit, which has at least one light source and an adapter optics having a light exit surface, and comprising a projection optics downstream of the lighting unit, wherein the adapter optics has a plurality of optical waveguide elements, each having a light in-coupling surface for feeding in light of the at least one light source and having light out-coupling surfaces lying in the light exit surface of the adapter optics, and projects a light pattern forwards into the traffic space, the optical waveguide elements extend between the light in-coupling surface and the light out-coupling surface, wherein the light out-coupling surface has a larger area than the light in-coupling surface, and each optical waveguide element is delimited laterally by two side surfaces, at the top by a top surface, and at the bottom by a base surface, and is formed tapering between the light exit surface and the light in-coupling surface, wherein the width of the base surface and/or of the top surface decreases starting from the light exit surface.

A headlamp of this type is for example shown in WO 2013/166535 A2 of the applicant. In such a headlamp, the layout of the optical waveguide elements, in which the light is guided by total internal reflection at the boundary walls, is important for a practical light image.

One object of the invention consists, for a headlamp of the subject type, in optimizing the shaping of the optical waveguide elements, primarily with regard to an even better homogeneity and maximum brightness of the light image created.

This object is achieved with a headlamp of the type mentioned at the beginning, in which the base surface and/or the top surface of at least one optical waveguide element has precisely one constriction with regard to its width between the light exit surface and the light in-coupling surface, which constriction has the minimum width of the base surface and/or the top surface.

By virtue of the invention, for each optical waveguide element used and constructed according to the invention, a light distribution results with fewer disruptive regions, but a higher maximum light intensity at the light exit surface or in the light image created, thus enabling to also improve the entire light image created by the plurality of optical waveguide elements.

A further development which is expedient in terms of lighting may provide that the top surface merges into the side surfaces on both sides via narrow chamfers.

Furthermore, it may be recommendable if the optical waveguide elements are combined in a matrix-like arrangement.

It may be advantageous if optical waveguide elements of a lowermost row of an at least two-line matrix of optical waveguide elements have a constriction.

In other cases, it may be advisable if optical waveguide elements of an uppermost row of an at least two-line matrix of optical waveguide elements have a constriction.

It is advantageous if the optical waveguide elements are integrally connected to one another in their front region, as this facilitates production and leads to a compact and stable adapter optics.

In this case, it may be sensible to have the light out-coupling surfaces of the optical waveguide elements coincide to form the light exit surface of the adapter optics.

A practical layout provides that the width of the constriction 10 is up to 80% of the width of the light in-coupling surface.

In practice, particularly good results with regard to the desired light image are obtained if the constriction is formed in the half of the optical waveguide element nearest to the light in-coupling surface.

Figure 7:
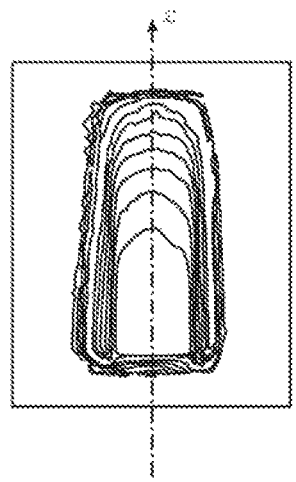
Figure 9:
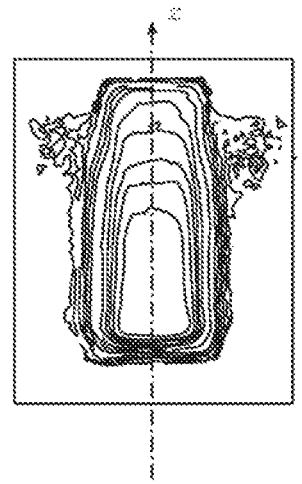
Figure 8:
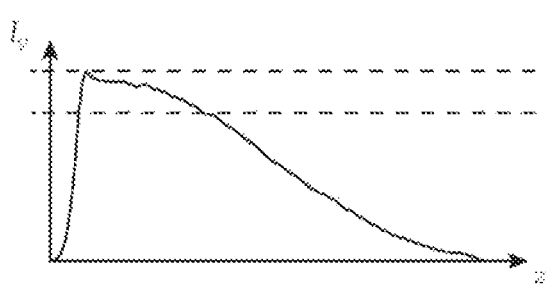
Figure 10:
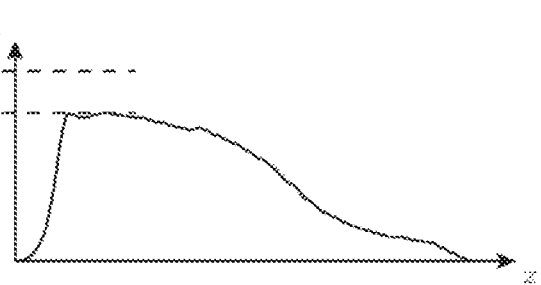

The invention, as well as further advantages and differences thereof from prior art, is explained in more detail in the following also on the basis of exemplary embodiments and shown in the drawing. In the figures FIG. 1 shows components of a headlamp, namely a lighting unit with focussing glass plate placed in front and a projection lens, schematically and in graphical representation, FIG. 2 shows an adapter optics in a graphical representation, seen obliquely from the rear in the direction of the light in-coupling surfaces of the optical waveguide elements, FIG. 3 shows one optical waveguide element according to the invention, seen obliquely from the rear in the direction of its light in-coupling surface, FIG. 4 shows the optical waveguide element of FIG. 3 in a view from below in the direction of the base surface thereof, FIG. 5 shows one optical waveguide element according to prior art, seen obliquely from the rear in the direction of its light in-coupling surface, FIG. 6 shows the optical waveguide element of FIG. 5 in a view from below in the direction of the base surface thereof, FIG. 7 shows an exemplary light distribution of a headlamp according to the invention, FIG. 8 shows the course of the light intensity along a central line of FIG. 7, FIG. 9 shows an exemplary light distribution of a headlamp according to prior art, and FIG. 10 shows the course of the light intensity along a central line of FIG. 9.

Figure 2:
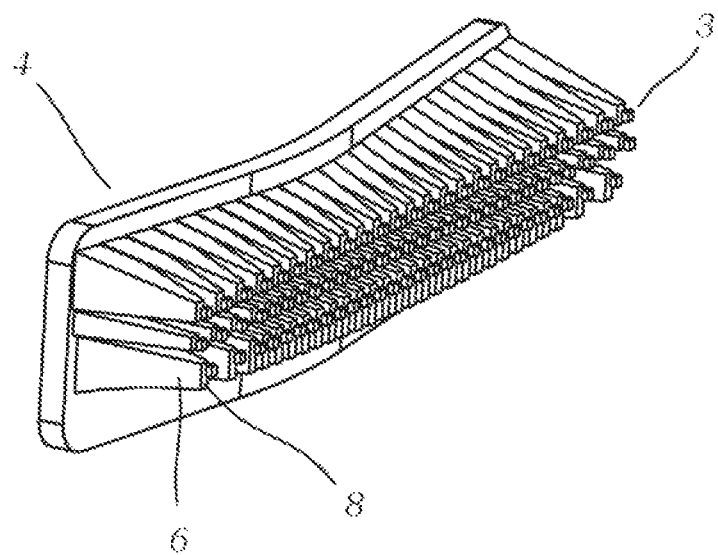

In the depiction according to FIG. 1, in schematic view, a headlamp 1 according to the invention is visible with its constituents which are important for explaining the invention, wherein it is clear for the person skilled in the art that a headlamp has a multiplicity of further constituents, which are not shown here, such as setting and adjustment devices, electrical supply means, screens and much more. When, in connection with the invention, the term "headlamp" is used, then this term should also include individual projection modules, which may also be included in combination in a superordinate headlamp.

In this and the following figures, for the purposes of simpler explanation and illustration, the same reference numbers are used for the same or comparable elements.

The reference numbers used in the claims are merely intended to facilitate the readability of the claims and the understanding of the invention and in no way have a character impairing the protective scope of the invention.

The motor-vehicle headlamp 1 has a lighting unit 2, which has a plurality of light sources, here an array of light-emitting diodes, LEDs 3 for short, and an adapter optics 4 with a light exit surface 5, wherein the adapter optics 4 comprises a number of optical waveguide elements 6. The LEDs 3 radiate their light into the light-conductive adapter optics 4, which outputs a desired light pattern forwards. This light pattern is projected into the traffic space by means of a projection optics 7, which in the present case is a one-piece lens.

In the larger depiction of FIG. 2, an exemplary design of the adapter optics 4 is visible, comprising a multiplicity of optical waveguide elements 6, which each have a light in-coupling surface 8. Preferably, to each optical waveguide element 6 precisely one light source is assigned, such as an LED 3 or a plurality of LEDs. It will be evident that light sources different from LEDs may also be used. In the illustrated exemplary embodiment of the lighting unit 2, the optical waveguide elements 6 are of elongated construction, having a larger extent in the propagation direction of the light than transversely thereto. They preferably are made of highly transparent, light-conductive and shapeable plastics, which are well-suited for the production of complex geometries. Silicone materials are particularly preferred in this case. The use of glasses is also possible however.

In FIGS. 3 and 4, which show an individual optical waveguide element 6 in an enlarged depiction, there is visible the more precise shape of the optical waveguide elements 6. Starting from light out-coupling surfaces 9, these have a tapering cross section towards the light in-coupling surface 8 thereof. For example, it may be provided that the optical waveguide elements 6 are constructed to be truncated-cone-shaped or, as shown in the figures, approximately trapezoidal.

The light of the at least one light source, here the LEDs 3, is fed into the light in-coupling surfaces 8. The light out-coupling surfaces 9 lie in the light exit surface 5 of the adapter optics 4. As a consequence of the taper mentioned, the light out-coupling surface 9 has a larger area than the light in-coupling surface 8. Laterally, the optical waveguide element 6 is delimited by two side surfaces 10, above by a top surface 11 and below by a base surface 12. In the embodiment shown, the top surface 11 merges via narrow chamfers 13 into the side surfaces 10 on both sides.

As can be seen from the FIGS. 3 and 4, the width of the base surface 12 decreases starting from the light out-coupling surface 9 to the light in-coupling surface 8, but not continuously, as the base surface 12 has a constriction 14 with regard to its width between the light out-coupling surface 9 and the light in-coupling surface 8, i.e. the width of the base surface 12 decreases, starting from a width $b_a$ of the light out-coupling of surface 9 up to the central region of the constriction 14, where the width $b_m$ is at its lowest, and then increases again in the direction of the light in-coupling surface 8 with a width $b_e$. In other words, the width of the base surface 12 has a minimum $b_m$, between the light out-coupling surface 9 and the light in-coupling surface 8. This design in the sense of the invention leads to an improved light conduction and to a light distribution, which gives fewer disruptive regions, but a higher maximum light intensity, which is also shown below.

To give an idea of possible dimensions, the following is specified for a practical exemplary embodiment:

light out-coupling surface 7.7 mm$^2$, light in-coupling surface 1.5 mm$^2$, length of the optical waveguide element 15 mm, width $b_a$ 1.8 mm, width $b_m$ 0.3 mm, width $b_e$ 0.6 mm.

In the exemplary embodiment illustrated and described above, the constriction 14 is formed at the base surface 12. It is, however, also possible analogously to form a constriction at the top surface 11, which is particularly advantageous for the light image, which is beneficial from an upper row of an adapter optics configured in a matrix-like manner. In this last-mentioned case, it may be provided that the width of the base surface 12 decreases steadily starting from the light in-coupling surface 8 up to the light out-coupling surface 9. However, it is also possible that a constriction 14 is formed both in the top surface 11 and in the base surface 12.

Generally, particularly good results are seen if the width $b_m$ of the constriction 14 is 10 to 80% of the width $b_e$ of the light in-coupling surface 8. In addition, one gets particularly good results with regard to the desired light image, if the constriction is formed in the half of the optical waveguide element nearest to the light in-coupling surface.

As can further be seen from the FIGS. 1 and 2, the optical waveguide elements 6 are integrally combined in a matrix-like manner, wherein their light out-coupling surfaces 9 coincide to form the light exit surface 5 of the adapter optics 4. The optical waveguide elements 6 may also be combined to form a plurality of segments, which then form the adapter optics 4, as shown in FIGS. 1 and 2 with three segments. In this case, the light exit surfaces of the individual segments may be planar or curved. Furthermore, it may also be provided as a function of the required light image, that only individual optical waveguide elements 6 or groups of optical waveguide elements 6 are constructed according to the invention and the remaining optical waveguide elements are constructed according to prior art, without a constriction 14.

The light out-coupling surfaces 9 of the optical waveguide elements 6 may coincide to form a common light exit surface 5 of the adapter optics 4. The common light exit surface is typically a curved surface which usually follows the Petzval surface of the imaging optics (e.g. an imaging lens). For certain applications, however, certain deviations in the curvature may be used in order to use imaging faults in the edge region for light homogenization.

The individual LEDs 3 or, very generally, light sources may be controlled individually in the known manner, in order to create a respectively desired light image, which may also be changed dynamically.

In the context of the current application, the term matrix should also apply for the extreme case, in which the matrix is single-line, thus only one row of optical waveguide elements is present, which absolutely makes sense in motor-vehicle lighting engineering. If the matrix is multi-line, then it may advantageously be provided that optical waveguide elements 6 of a lowermost row (line) of optical waveguide elements or optical waveguide elements 6 of an uppermost row have a constriction 14. Of course, a lowermost row and an uppermost row may also have corresponding optical waveguide elements, wherein it is to be noted that not necessarily all optical waveguide elements of a row (line) have to be designed the same way or have to have a constriction.

According to the invention, the structure of a headlamp or headlamp module with matrix-like arrangement is particularly efficient if the optical waveguide elements are arranged in precisely three rows arranged above one another, which together form a main-beam distribution. In such an arrangement, the upper row may be formed as a forward row, the central row is formed as an asymmetric row and the lower row is formed as a main-beam row, wherein the main-beam row made from main-beam optical waveguide elements is provided with constrictions of the current type.

In what are known as pixel main-beam modules, all main-beam optical waveguide elements may be arranged in precisely one row and formed with constrictions. Expediently, the lowermost row is the main-beam row (or "line").

In FIGS. 5 and 6, analogous images of an optical waveguide element according to prior art are shown in the drawing, so that the constriction 14 according to the invention, which is not known in prior art, can be seen better.

The explanation given below, presenting a comparison of FIGS. 7 and 8, and 9 and 10, respectively, further demonstrates the advantages of the invention.

FIG. 7 shows an exemplary light distribution of an individual optical waveguide element, which is constructed according to the invention, with lines of equal light intensity drawn in and FIG. 8 shows the course of the light intensity Iv along the central line z drawn-in in FIG. 7, wherein the left side of the graph corresponds to the lower region of FIG. 7.

FIG. 9 corresponds to the depiction of FIG. 7, but for an optical waveguide element according to prior art, as illustrated in FIGS. 5 and 6. There are visible undesired scattered light regions on both sides of the desired light image, which are not found in the case of the optical waveguide element according to the invention, as the opposite FIG. 7 shows.

In FIG. 10, which corresponds to the graph of FIG. 8, but for an optical waveguide element according to prior art, as can be seen, the light intensity curve has a lower maximum light intensity than that of an optical waveguide element according to the invention, as the opposite FIG. 8 shows.

Using a headlamp of the type shown, it is possible to create for example a dipped beam or a main beam, which is why for example the left headlamp and the right headlamp are each constructed as headlamps according to the invention, using which the left and right part of the light distribution respectively are created. On the other hand, the left and the right headlamps may also create identical light images, which overlap on the road.

LIST OF REFERENCE NUMERALS

1 Motor-vehicle headlamp
2 Lighting unit
3 LEDs
4 Adapter optics
5 Light exit surface
6 Optical waveguide elements
7 Projection optics
8 Light in-coupling surface
9 Light out-coupling surface
10 Side surfaces
11 Top surface
12 Base surface
13 Chamfers
14 Constriction
$b_a$ Width
$b_e$ Width
$b_m$ Width

The invention claimed is:

1. A motor-vehicle headlamp (1) comprising:
a lighting unit (2), which includes at least one light source (3) and an adapter optics (4) having a light exit surface (5), and
a projection optics (7) downstream of the lighting unit, wherein the adapter optics includes a plurality of optical waveguide elements (6), each having a light in-coupling surface (8) for feeding in light from the at least one light source and having light out-coupling surfaces (9) located in the light exit surface of the adapter optics, and is configured to project the light forward into traffic space, the optical waveguide elements extending between the light in-coupling surface and the light out-coupling surface, the light out-coupling surface having a larger area than the light in-coupling surface, and each optical waveguide element is delimited laterally by two side surfaces (10), at the top by a top surface (11), and at the bottom by a base surface (12) and each optical waveguide element tapers between the light out-coupling surface and the light in-coupling surface, wherein the width of the base surface and/or the width of the top surface decreases starting from both the light in-coupling surface and the light exit surface,
wherein the base surface (12) and/or the top surface (11) of at least one optical waveguide element (6) has precisely one constriction (14) with regard to its width between the light out-coupling surface (9) and the light in-coupling surface (8), wherein the constriction has the minimum width ($b_m$) of the base surface and/or the top surface.

2. The motor-vehicle headlamp (1) according to claim 1, wherein the top surface (11) and/or the bottom surface (12) merges via narrow chamfers (13) into the side surfaces (10) on both sides.

3. The motor-vehicle headlamp (1) according to claim 1, wherein the plurality of optical waveguide elements (6) are combined in a matrix-like arrangement.

4. The motor-vehicle headlamp (1) according to claim 3, wherein optical waveguide elements (6) of a lowermost row of an at least two-line matrix of optical waveguide elements have a constriction (14).

5. The motor-vehicle headlamp (1) according to claim 3, wherein optical waveguide elements (6) of an uppermost row of an at least two-line matrix of optical waveguide elements have a constriction (14).

6. The motor-vehicle headlamp (1) according claim 3, wherein the light out-coupling surfaces (9) of the optical waveguide elements (6) coincide to form the light exit surface (5) of the adapter optics (4).

7. The motor-vehicle headlamp (1) according to claim 1, wherein the plurality of optical waveguide elements (6) are integrally connected to one another in their front region.

8. The motor-vehicle headlamp (1) according to claim 1, wherein the width ($b_m$) of the constriction (14) is 10% to 80% of the width ($b_e$) of the light in-coupling surface (8).

9. The motor-vehicle headlamp (1) according to claim 1, wherein the constriction (14) is formed in the half of the optical waveguide element (6) nearest to the light in-coupling surface (8).

* * * * *